United States Patent

Franks

[11] 3,721,124
[45] March 20, 1973

[54] DEVICE FOR INDICATING THE TEMPERATURE AND DEPTH OF WATER

[75] Inventor: Buryl A. Franks, Tulsa, Okla.

[73] Assignee: Lowrance Electronics, Inc., Tulsa, Okla.

[22] Filed: Dec. 10, 1970

[21] Appl. No.: 96,785

[52] U.S. Cl. .................................................. 73/344
[51] Int. Cl. .................................................. G01k 1/14
[58] Field of Search ....73/344; 242/85.1, 100, 100.1, 242/106

[56] References Cited

UNITED STATES PATENTS

| | | | |
|---|---|---|---|
| 3,087,338 | 4/1963 | Horbinski | 73/344 |
| 2,417,587 | 3/1947 | Damstra | 242/100 |

*Primary Examiner*—Louis R. Prince
*Assistant Examiner*—Denis E. Corr
*Attorney*—Head & Johnson

[57] ABSTRACT

A device for indicating the temperature and depth of water, including a housing having a temperature indicating meter in one end, a spool extending from the other end of the housing having a cable wound thereon, one end of the cable being connected to the meter, a temperature sensing probe connected to the other end of the cable, the cable having depth markings at spaced intervals thereon, and a cover affixed to said spool and slidable between closed and opened positions, in the opened position the cover being spaced away from the housing and exposing the spool whereby the cable may be wound onto and off the spool and in the closed position the cover contacting the housing and encompassing the spool.

3 Claims, 6 Drawing Figures

PATENTED MAR 20 1973

INVENTOR
BUYRL A. FRANKS

BY

*Head & Johnson*

ATTORNEYS

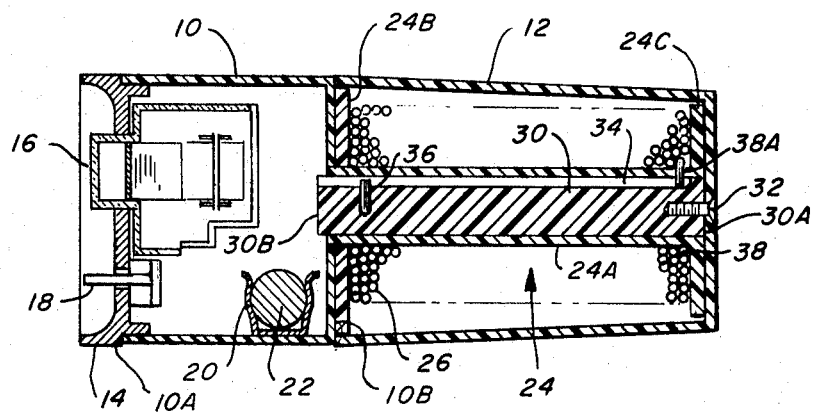
FIG. 3
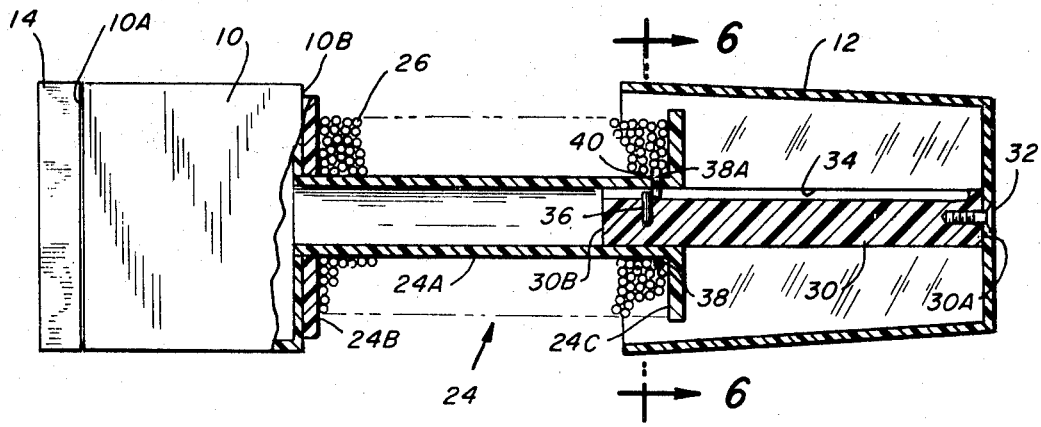
FIG. 4
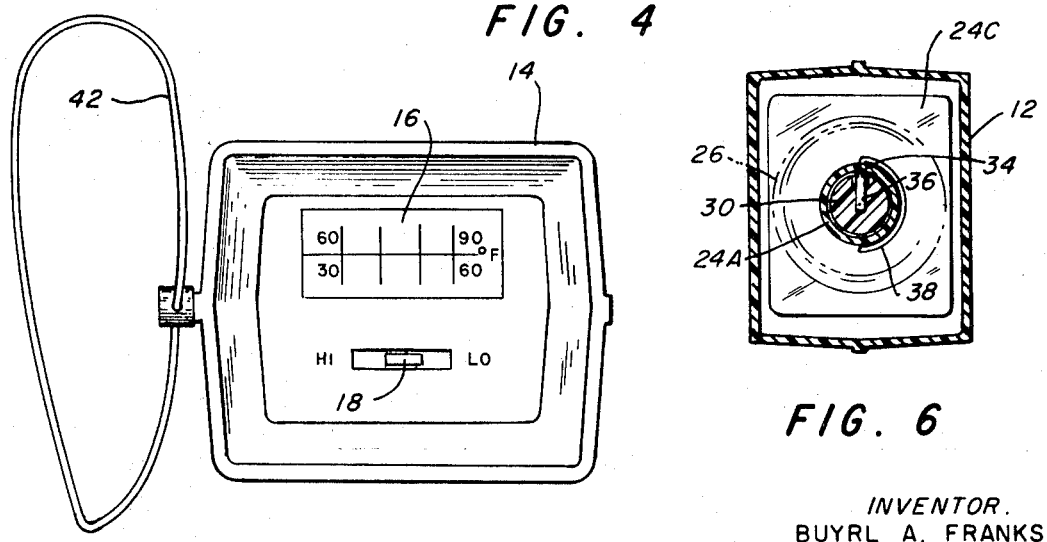
FIG. 5
FIG. 6
INVENTOR.
BUYRL A. FRANKS
BY
*Head & Johnson*
ATTORNEYS

DEVICE FOR INDICATING THE TEMPERATURE AND DEPTH OF WATER

BACKGROUND, SUMMARY AND OBJECTS OF THE INVENTION

It is known that different species of fish prefer different ranges of water temperature. For instance, lake trout prefer water between 40° and 50°F, whereas catfish prefer water between 70° and 85°F. Other species of fish usually prefer water temperatures somewhere between those for trout and catfish. In addition, it is known that water temperature effects the digestive rate and metabolism of fish since the fish body temperature is always substantially equal to that of the water in which the fish exist. Water temperature below that at which a fish normally prefers results in the fish's digestive rate decreasing, while warmer water causes the digestive rate and metabolism to increase and the fish to feed more often and more heavily. In water that is too warm or too cold fish become inactive and are listless and non-aggressive in their eating habits. When the water temperature departs too far above or below that of the preferred range of the fish, they usually refrain from eating at all. Thus it is important for fishermen to be able to find the depth at which the water temperature corresponds to the range of temperature preferred by the species of fish he intends to catch.

As the seasonal temperatures change, thermal stratification of water occurs and thermoclines may develop at which the temperature of water drops sharply. The layer of water above the thermocline is called the epilimnion; the layer below the thermocline is called the hypolimnion, where the water is normally very cold. Warm water fish and forage fish seldom venture into the hypolimnion. Expert fishermen need to know the depths of these different water conditions for most effective fishing.

While others have suggested the general concept of measuring the depth of the water and the temperature, this invention provides a unique means of arranging the elements necessary for such measurements into a compact instrument for travel, storage and usage. The invention is particularly unique in that it provides an arrangement for combining a meter, a cable and a probe for indicating the temperature and depth of water and includes provision for winding and storage of the cable in a closed, compact apparatus.

It is therefore an object of this invention to provide an improved device for indicating the temperature and depth of water.

More specifically, an object of this invention is to provide a device for indicating the temperature and depth of water including a housing, a cable having depth markings thereon and a probe at one end, a meter enclosed in one end of the housing and a spool affixed to the other end of the housing for receiving the cable thereon, and cover means for exposing the spool when it is desired to wind or unwind cable therefrom and for closing the spool when the cable is not in use.

These general objects, as well as more specific objects of the invention, will be fulfilled by the apparatus to be now described in the following specifications and claims, taken in conjunction with the attached drawings.

DESCRIPTION OF THE VIEWS

FIG. 3 is a cross-sectional view taken along the line 3—3 of FIG. 1.

FIG. 4 is a cross-sectional view as shown in FIG. 3, but showing the cover in opened position to permit the cable to be wound and unwound from the spool.

FIG. 5 is a front view of the device of this invention.

FIG. 6 is a cross-sectional view taken along the line 6—6 of FIG. 4.

DETAILED DESCRIPTION

Figure 1:
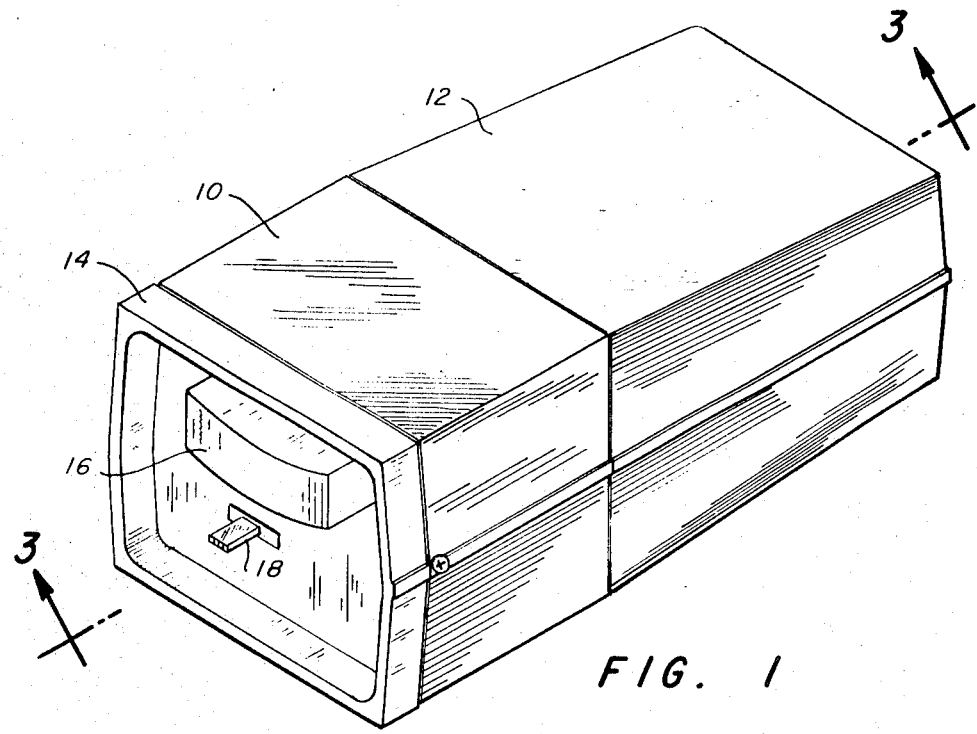
FIG. 1 is an isometric view of the device for indicating the temperature and depth of water of this invention, shown in the closed position.

Referring now to the drawings, first to FIG. 1, a device exemplifying the invention is shown. The device is an instrument for indicating the depth and temperature of water and includes a housing 10, a cover 12, a meter bezel 14, an indicating meter 16 and a range switch 18.

Figure 2:
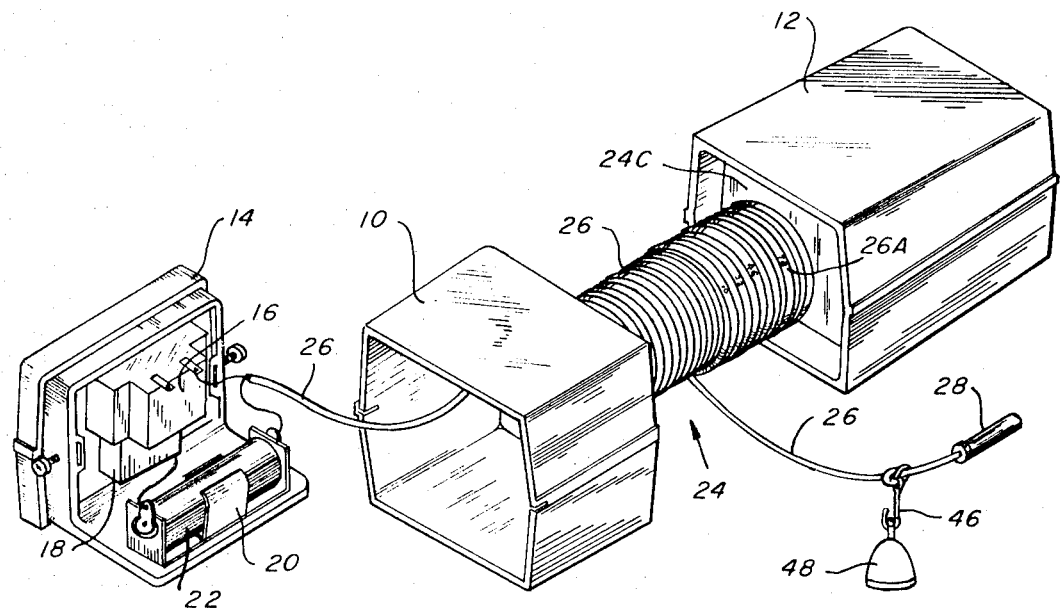
FIG. 2 is a view of the device of this invention, in open position, and meter bezel removed from the housing.

The meter bezel 14, as shown in FIG. 2, preferably includes a clip 20 for mounting a battery 22.

As shown best in FIGS. 3 and 4, housing 10 includes a forward surface 10A and a rearward surface 10B. The meter bezel 14 is supported to the housing forward end 10A. Affixed to and extending from the housing rearward end 10B is a spool generally indicated by the numeral 24. Spool 24 includes a central tubular portion 24A, a first horizontal portion 24B affixed to the rearward end 10B of housing 10, and a rearward horizontal portion 24C. Wound on the spool 24 is a cable 26; one end of the cable 26 being attached to meter 18 as shown in FIG. 2, the other end of cable 26 has affixed to it a temperature sensing probe 28. Probe 28 may be such as a thermistor or other device which changes resistance with temperature. In addition, the probe 28 may be of a thermocouple type. The specific circuit arrangement wherein the probe 28 indicates temperature by means of meter 16 is not a part of this invention since such circuits are well known in the art.

Cover 12 has a central elongated support member 30 which may be circular in cross section if the tubular opening of tubular portion 24A is circular. In any event, the cross-sectional configuration of the axial opening of tubular portion 24A of the spool 24 is such as to slidably receive the support member 30. The rearward end 30A of the support member is affixed to the cover 12 such as by means of screw 32, while the inner end 30B of the support member is received within the spool tubular portion 24A. This arrangement permits the cover 12 to be slidable between a closed position wherein the cover 12 contacts the housing 10 as shown in FIGS. 1 and 3, and an opened position wherein the spool 24 is exposed so that cable 26 may be wound or unwound therefrom, as shown in FIGS. 2 and 4.

The cover support member 30 has an elongated slot 34 in the outer surface. Adjacent end 30B of the cover support member a stop element 36 is positioned, extending within slot 34 (See FIGS. 4 and 6). Received about spool tubular portion 24A is a circular spring 38 having one end 38A bent at a sharp angle and extending through an opening 40 in the spool. The end 38A of the spring is slidably received within slot 40 and engages the stop element 36 as the cover 12 is slid to the limit of the opened position.

As shown in FIG. 5, the meter 16 may be provided with two scales covering two temperature ranges by means of range switch 18. To reduce the chance of the device being dropped into the water while it is being used, a lanyard 42 is provided. The user may insert the lanyard 42 over his hand while using the device.

On cable 26 are depth indicators 26A in spaced intervals, such as one for each foot (See FIG. 2). These depth indicators are measured from probe 28 to indicate the depth of the probe beneath the water's surface. As the probe is lowered into the water cable 26 is unwound from spool 24. To help carry the probe 28 downward into the water and to keep cable 26 reasonably taut for improved accuracy of depth measurement, a clip 46 is attached to the cable adjacent the probe. A lead fishing weight 48 may then be attached by means of the clip 46 to the cable.

The device is normally stored as shown in FIG. 1. In such configuration the cable and probe are completely enclosed and cannot become entangled with other equipment or be easily damaged. Switch 18 may include an "off" position so that battery power is not being used except when the device is in actual use for temperature measurement.

When the fisherman wishes to measure the temperature of water, he slides the cover 12 rearwardly to the open position as shown in FIGS. 2 and 4. He may then unwind cable 26 from the spool 24 and lower the probe 28 into the water. As the probe goes downwardly in the water, the depth of the probe is indicated by the depth markers 44 on the cable. At the same time the fisherman can read the temperature at each depth he desires by means of meter 16. The fisherman can easily determine the depth at which the water temperature is most favorable for the species of fish he seeks, and may quickly determine the presence of the thermocline and other characteristics of the water.

As previously indicated, the invention is not in the circuitry involved, or the basic concept of measuring water temperature, or measuring the depth of water, but in the unique arrangement of the device including improved means for storing the cable when not in use and for making the cable readily accessible for winding and unwinding when the device is to be used.

While the invention has been described with a certain degree of particularity it is manifest that many changes may be made in the details of construction and the arrangement of components without departing from the spirit and scope of this disclosure. It is understood that the invention is not limited to the specific embodiments set forth herein which have been illustrated and described for purposes of exemplifying the invention, but the invention is to be limited only by the scope of the attached claim or claims, including the full range of equivalency to which each element or step thereof is entitled.

What is claimed is:

1. A device for indicating the temperature and depth of water comprising:
    a housing having a forward and a rearward end, the forward end including meter receiving means;
    a spool extending from the housing rearward end adaptable to receive a cable thereon, the spool including a tubular portion;
    a meter received within said housing forward end;
    a cable wound upon said spool having one end connected to said meter, the cable having depth markings in spaced intervals thereon;
    a temperature sensing probe connected to the other end of said cable;
    a cover affixed to said spool and slidable between a closed and an opened position, the cover including a centrally received elongated support member having one end affixed to the cover, the other end of the support member being slidably received within said spool tubular portion, in the opened position the cover being spaced away from said housing and exposing said spool whereby cable may be wound onto and off said spool, and in the closed position said cover contacting said housing and encompassing said spool; and
    means of limiting the slidable movement of said cover away from said housing to prevent said cover from being unintentionally detached from said spool.

2. A device for indicating the temperature and depth of water according to claim 1 wherein said means of limiting the slidable movement of said cover away from said housing includes means of limiting the travel of said support member within said spool tubular portion to prevent said support member from being fully withdrawn from said spool.

3. A device for indicating the temperature and depth of water according to claim 2 wherein said elongated support member has a longitudinal groove in the outer surface thereof, and including:
    a stop element affixed to said support member within said slot and adjacent the end thereof opposite the end affixed to said cover; and
    a spring received around said tubular portion of said spool and having one end thereof extending through a small diameter hole in said spool whereby said end of said spring extends slidably within said slot in said elongated support member and whereby said end of said spring engages said stop member affixed to said support member as said cover is moved away from said housing.

* * * * *